US009894166B2

(12) United States Patent
Wu (10) Patent No.: US 9,894,166 B2
(45) Date of Patent: Feb. 13, 2018

(54) REGISTRATION METHOD AND SYSTEM FOR COMMON SERVICE ENTITY (71) Applicant: ZTE CORPORATION, Shenzhen, Guangdong Province (CN)

(72) Inventor: Hao Wu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 15/036,419

(22) PCT Filed: Apr. 15, 2014

(86) PCT No.: PCT/CN2014/075375
§ 371 (c)(1),
(2) Date: May 13, 2016

(87) PCT Pub. No.: WO2014/169804
PCT Pub. Date: Oct. 23, 2014

(65) Prior Publication Data
US 2016/0294886 A1  Oct. 6, 2016

(30) Foreign Application Priority Data

Nov. 26, 2013 (CN) .......................... 2013 1 0611226

(51) Int. Cl.
*H04L 29/08* (2006.01)
*H04W 72/00* (2009.01)
(Continued)

(52) U.S. Cl.
CPC .......... *H04L 67/16* (2013.01); *H04L 41/0803* (2013.01); *H04L 47/743* (2013.01);
(Continued)

(58) Field of Classification Search
CPC ....... H04W 4/005; H04W 8/00; H04W 8/005; H04W 72/00; H04L 41/082;
(Continued)

(56) References Cited

U.S. PATENT DOCUMENTS 9,167,517 B2 * 10/2015 MacKenzie ........... H04W 4/005
9,363,839 B2 * 6/2016 Zhao ..................... H04W 8/186
(Continued)

FOREIGN PATENT DOCUMENTS

CN   101094530 A   12/2007
CN   101374247 A    2/2009
(Continued)

OTHER PUBLICATIONS

OneM2M, "oneM2M Functional Architecture", Jul. 26 2013, oneM2M-TS-001 oneM2M Functional Architecture-V-0.0.5.*
(Continued)

*Primary Examiner* — Ramy M Osman
(74) *Attorney, Agent, or Firm* — Ling Wu; Stephen Yang; Ling and Yang Intellectual Property (57) ABSTRACT

A registration method and system for a common service entity (CSE) relate to the field of machine type communication; solve the problem that a CSE registration mechanism cannot implement an application interactive function. The method includes: an originator CSE sending a CSE resource creation request message to a receiver CSE; the receiver CSE detecting whether a resource corresponding to an identifier of the originator CSE exists in local; the receiver CSE creating a resource for the originator CSE when no resource corresponding to the identifier of the originator CSE exists in local, setting a resource name according to the identifier of the originator CSE, and saving a type of the originator CSE as an attribute, and generating a CSE resource creation response message indicating that the
(Continued)

resource creation is successful; the receiver CSE sending the CSE resource creation response message to the originator CSE.

20 Claims, 3 Drawing Sheets

(51) Int. Cl.
| | | |
|---|---|---|
| *H04L 29/06* | (2006.01) | |
| *H04L 12/24* | (2006.01) | |
| *H04W 4/00* | (2018.01) | |
| *H04W 8/06* | (2009.01) | |
| *H04L 12/911* | (2013.01) | |

(52) U.S. Cl.
CPC .............. *H04L 63/10* (2013.01); *H04L 67/32* (2013.01); *H04W 4/005* (2013.01); *H04W 8/06* (2013.01); *H04W 72/00* (2013.01); *H04L 65/1073* (2013.01)

(58) Field of Classification Search
CPC ..... H04L 41/0803; H04L 63/10; H04L 67/10; H04L 67/16; H04L 67/32; H04L 67/327; H04L 47/743
See application file for complete search history.

(56) References Cited

U.S. PATENT DOCUMENTS

| | | | | |
|---|---|---|---|---|
| 2013/0017827 A1* | 1/2013 | Muhanna | .............. | H04W 4/005 455/426.1 |
| 2015/0245205 A1* | 8/2015 | Kim | ...................... | H04W 4/005 726/4 |
| 2015/0358874 A1* | 12/2015 | Ahn | ...................... | H04W 4/005 370/331 |
| 2016/0192111 A1* | 6/2016 | Choi | ........................ | H04L 67/26 455/507 |
| 2016/0217013 A1* | 7/2016 | Song | ................. | G06F 17/30477 |
| 2016/0294886 A1* | 10/2016 | Wu | ...................... | H04L 65/1073 |
| 2016/0302085 A1* | 10/2016 | Park | ...................... | H04L 67/303 |
| 2017/0055105 A1* | 2/2017 | Wu | ........................ | H04W 8/00 |
| 2017/0099562 A1* | 4/2017 | Bhalla | .................... | H04W 4/005 |
| 2017/0134523 A1* | 5/2017 | Wu | ...................... | H04L 67/327 |
| 2017/0142614 A1* | 5/2017 | Wu | ........................ | H04W 4/005 |
| 2017/0164138 A1* | 6/2017 | Wu | ........................ | H04W 4/005 |

FOREIGN PATENT DOCUMENTS

| | | |
|---|---|---|
| CN | 102177757 A | 9/2011 |
| CN | 102457839 A | 5/2012 |

OTHER PUBLICATIONS

XP084003902; One M2M ;DM Collaboration-OMA&BBF: Deployment Scenarios; WG5-MA5; Tim Carey, ALU, timothy.carey@alcatedl-lucent.com; Nov. 6, 2013.

XP084003946; OneM2M Functional Architecture; OneM2M-TS-0001-n-0.2.2 Nov. 8, 2013.

* cited by examiner

REGISTRATION METHOD AND SYSTEM FOR COMMON SERVICE ENTITY

TECHNICAL FIELD

The present document relates to the field of Machine Type Communication (MTC), and more particularly, to a registration method and system for a common service entity.

BACKGROUND OF THE RELATED ART

An M2M communication network consists of respective M2M nodes and a carrier network. The M2M nodes communicate with each other through the carrier network, and one M2M node consists of at least one application or one common service entity.

The M2M nodes can be divided into two categories according to different functions: nodes comprising the Common Service Entity (referred to as CSE) and nodes not comprising the CSE. Herein the node not comprising the CSE comprises:

an application dedicated node: which must have at least one application, and does not comprise the CSE.

a Node comprising the CSE comprises:

an application service node: whose function must have at least one application and one CSE, and corresponds to a terminal device physically.

an intermediate node: which must have at least one CSE in function, may have at least one application; and physically corresponds to a gateway device, and is responsible for managing terminal devices connected to the gateway, and managing the terminals and services to provide connections to servers.

an Infrastructure node: which must have at least one CSE in function, and may have at least one application, and physically act as service providing servers at the network side to provide management and service support for the terminal devices and the gateway devices.

The configuration of one basic M2M service provider usually comprises: one infrastructure node, a plurality of intermediate nodes and a plurality of service application nodes.

Figure 1:
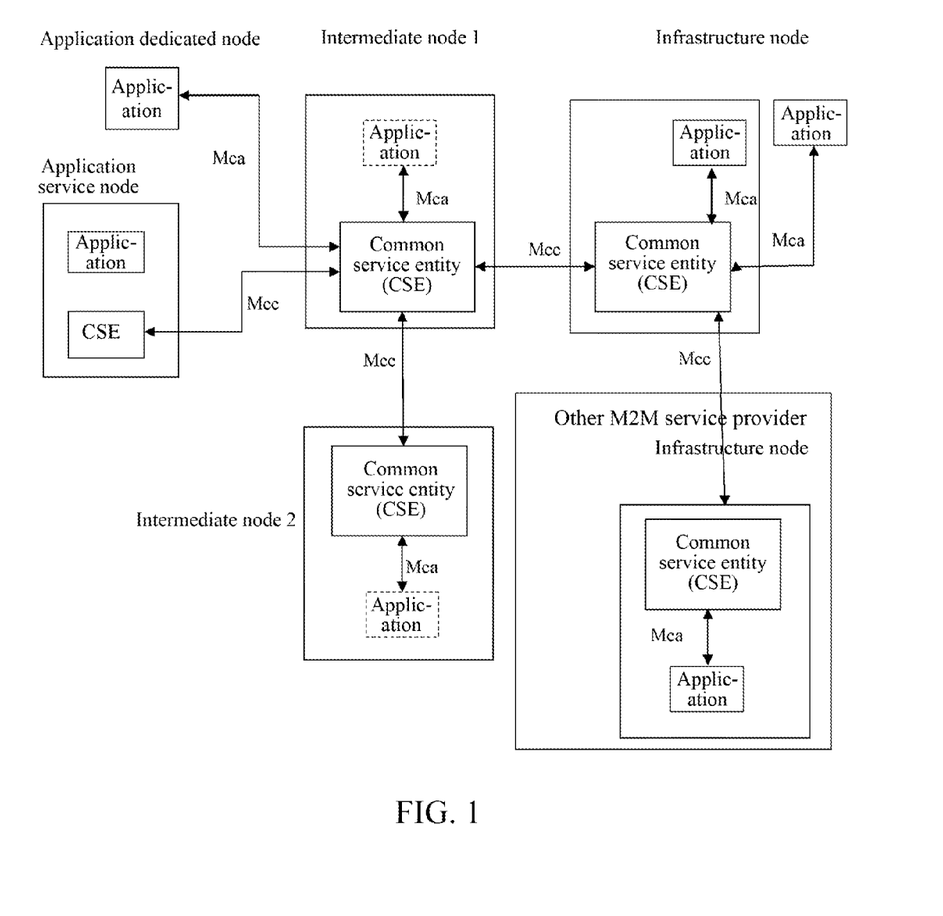
FIG. 1 is a schematic diagram of an M2M applications network.

The communication between M2M applications is implemented through the interaction between the common service entities (CSEs), and the M2M applications are connected to the CSE via the Mca interface, and the communication between the CSEs is implemented through the Mcc interface, while the premise of the communication is that the M2M applications first need to register in a local CSE, then the interaction of the M2M applications can be implemented through the communication between the CSEs, as shown in FIG. 1.

In a traditional M2M service, all the communication is implemented with a single application, for example, in the smart meter service managed by the grid company, an application in the smart meter of the terminal only needs to interact with application in the server managed by the grid company, however, with the expansion of the M2M service, it is possible that the interaction is needed between different applications, for example, in addition to enjoying the smart home appliances online troubleshooting repair service provided by a smart appliance company, the smart appliances may also enjoy online movie service provided by other video service providers.

The related CSE registration mechanism cannot implement the application interactive function.

SUMMARY

The present document provides a registration method and system for common service entity, and solves the problem that the existing CSE registration mechanism cannot implement the application interactive function.

A registration method for common service entity (CSE) comprises:

an originator CSE sending a CSE resource creation request message to a receiver CSE, wherein the CSE resource creation request message comprises:

an identifier of the originator CSE and a type of the originator CSE, or, an identifier of the originator CSE, a type of the originator CSE, and an M2M service provider's identifier of the originator CSE;

the receiver CSE detecting whether there is a resource corresponding to the identifier of the originator CSE in local;

the receiver CSE creating a resource for the originator CSE when there is no resource corresponding to the identifier of the originator CSE in local, setting a resource name according to the identifier of the originator CSE, saving the type of the originator CSE as an attribute, and generating a CSE resource creation response message indicating that the resource creation is successful;

the receiver CSE sending the CSE resource creation response message to the originator CSE.

Preferably, after the step of the receiver CSE detecting whether there is already a resource corresponding to the identifier of the originator CSE in local, the method further comprises:

if there is a resource corresponding to the identifier of the originator CSE in local, the receiver CSE generating a CSE resource creation response message indicating that the resource creation is failed;

the receiver CSE sending the CSE resource creation response message to the originator CSE.

Preferably, when the CSE resource creation request message comprises the M2M service provider's identifier of the originator CSE, after the step of the receiver CSE detecting whether there is already a resource corresponding to the identifier of the originator CSE in local, the method further comprises:

if there is no resource corresponding to the identifier of the originator CSE in local, the receiver CSE comparing a received M2M service provider's identifier of the originator CSE with an M2M service provider's identifier of a receiver CSE with a local attribute;

when the M2M service provider's identifier of the originator CSE and the M2M service provider's identifier of the receiver CSE with the local attribute are the same, the receiver CSE creating a resource for the originator CSE, setting a resource name according to the identifier of the originator CSE and saving the type of the originator CSE as an attribute, and generating a CSE resource creation response message indicating that the resource creation is successful;

the receiver CSE sending the CSE resource creation response message to the originator CSE.

Preferably, after the step of, if there is no resource corresponding to the identifier of the originator CSE in local, the receiver CSE comparing a received M2M service provider's identifier of the originator CSE with an M2M service provider's identifier of a receiver CSE with a local attribute, the method further comprises:

when the M2M service provider's identifier of the originator CSE and the M2M service provider's identifier of the receiver CSE with the local attribute are different, the receiver CSE generating a CSE resource creation response message indicating that the resource creation is failed;

the receiver CSE sending the CSE resource creation response message to the originator CSE.

Preferably, the CSE resource creation response message comprises:

an indication that resource creation is failed; or, an indication that resource creation is successful; or, an indication that resource creation is successful, an identifier of the receiver CSE and a type of the receiver CSE; or, an indication that resource creation is successful, an identifier of the receiver CSE, a type of the receiver CSE, and an M2M service provider's identifier of the receiver CSE.

Preferably, after the step of the receiver CSE sending the CSE resource creation response message to the originator CSE, the method further comprises:

the originator CSE creating a resource for the receiver CSE, setting a resource name according to the identifier of the receiver CSE, and saving the type of the receiver CSE as an attribute.

Preferably, when the CSE resource creation response message comprises the M2M service provider's identifier of the receiver CSE, the method further comprises:

the originator CSE setting the M2M service provider's identifier of the receiver CSE as a local attribute to save, or, setting the M2M service provider's identifier of the receiver CSE as a local attribute and as an attribute of the resource created for the receiver CSE to save.

Preferably, after the step of the receiver CSE sending the CSE resource creation response message to the originator CSE, the method further comprises:

after sending the CSE resource creation response message indicating that the resource creation is successful, the receiver CSE sending a CSE resource creation request message to the originator CSE, wherein the CSE resource creation request message comprises:

an identifier of the receiver CSE and a type of the receiver CSE, or, an identifier of the receiver CSE, a type of the receiver CSE and an M2M service provider's identifier of the receiver CSE.

Preferably, after the step of, after sending the CSE resource creation response message indicating that the resource creation is successful, the receiver CSE sending a CSE resource creation request message to the originator CSE, the method further comprises:

after receiving the CSE resource creation response message sent by the receiver CSE, the originator CSE detecting whether there is already a resource corresponding to the identifier of the receiver CSE in local;

if there is already the resource corresponding to the identifier of the receiver CSE in the local area of the originator CSE, the originator CSE generating a CSE resource creation response message indicating that the resource already exists or the resource creation is successful and sending the message to the receiver CSE;

if there is no resource corresponding to the identifier of the receiver CSE in the local area of the originator CSE, the originator CSE creating a resource for the receiver CSE, and saving the type of the receiver CSE as an attribute, generating a CSE resource creation response message indicating that the resource creation is successful and sending the message to the receiver CSE.

Preferably, when the CSE resource creation request message sent by the receiver CSE comprises the M2M service provider's identifier of the receiver CSE, and after the step of, after receiving the CSE resource creation response message sent by the receiver CSE, the originator CSE detecting whether there is already the resource corresponding to the identifier of the receiver CSE in local, the method further comprises:

the originator CSE comparing the received M2M service provider's identifier of the receiver CSE with the M2M service provider's identifier of the originator CSE with a local attribute, when a comparison result is that the received M2M service provider's identifier of the receiver CSE and the M2M service provider's identifier of the originator CSE with a local attribute are the same, the originator CSE creating a resource for the receiver CSE, setting a resource name according to the identifier of the receiver CSE and saving the type of the receiver CSE as an attribute, generating a CSE resource creation response message indicating that the resource creation is successful and sending the message to the receiver CSE;

when the comparison result is that the received M2M service provider's identifier of the receiver CSE and the M2M service provider's identifier of the originator CSE with a local attribute are different, the originator CSE generating a CSE resource creation response message indicating that the resource creation is failed and sending the message to the receiver CSE.

Preferably, the method further comprises:

after the receiver CSE receives the CSE resource creation response message sent by the originator CSE, if the CSE resource creation response message indicates that the resource creation is successful or the resource already exists, then completing a registration;

if the CSE resource creation response message indicates that the resource creation is failed, then deleting the resource created for the originator CSE.

Preferably, the method further comprises:

the receiver CSE starting a waiting timer when sending the CSE resource creation request message.

Preferably, the method further comprises:

if the receiver CSE still does not receive the CSE resource creation response message sent by the originator CSE when the waiting timer expires, the receiver CSE deleting the resource created for the originator CSE.

Preferably, after creating the resource, the attribute "Online Status" of the resource is set to be "Online".

The present document further provides a registration system for the common service entity, comprising an originator CSE and a receiver CSE;

the originator CSE is configured to, send a CSE resource creation request message to a receiver CSE, wherein the CSE resource creation request message comprises:

an identifier of the originator CSE and a type of the originator CSE, or, an identifier of the originator CSE, a type of the originator CSE, and an M2M service provider's identifier of the originator CSE;

the receiver CSE is configured to: detect whether there is already a resource corresponding to the identifier of the originator CSE in local, create a resource for the originator CSE if there is no resource corresponding to the identifier of the originator CSE in local, set a resource name according to the identifier of the originator CSE, and save the type of the originator CSE as an attribute, generate a CSE resource creation response message indicating that the resource creation is successful; and send the CSE resource creation response message to the originator CSE.

Preferably, the receiver CSE is further configured to: if there is a resource corresponding to the identifier of the originator CSE in local, generate a CSE resource creation response message indicating that the resource creation is failed, and send the CSE resource creation response message to the originator CSE.

Preferably, the receiver CSE is further configured to: if there is no resource corresponding to the identifier of the originator CSE in local, compare a received M2M service provider's identifier of the originator CSE with an M2M service provider's identifier of a receiver CSE with a local attribute, if the M2M service provider's identifier of the originator CSE and the M2M service provider's identifier of the receiver CSE with the local attribute are the same, create a resource for the originator CSE, set a resource name according to the identifier of the originator CSE and save the type of the originator CSE as an attribute, generate a CSE resource creation response message indicating that the resource creation is successful and send the CSE resource creation response message to the originator CSE, When the M2M service provider's identifier of the originator CSE and the M2M service provider's identifier of the receiver CSE with the local attribute are different, generate a CSE resource creation response message indicating that the resource creation is failed; and send the CSE resource creation response message to the originator CSE.

Preferably, the originator CSE is further configured to: create a resource for the receiver CSE, set a resource name according to the identifier of the receiver CSE, and save the type of the receiver CSE as an attribute.

Preferably, the originator CSE is further configured to: when the CSE resource creation response message comprises the M2M service provider's identifier of the receiver CSE, set the M2M service provider's identifier of the receiver CSE as a local attribute to save, or, set the M2M service provider's identifier of the receiver CSE as a local attribute and as an attribute of the resource created for the receiver CSE to save.

Preferably, the receiver CSE is further configured to: after sending the CSE resource creation response message indicating that the resource creation is successful, send a CSE resource creation request message to the originator CSE, wherein the CSE resource creation request message comprises:

an identifier of the receiver CSE and a type of the receiver CSE, or, an identifier of the receiver CSE, a type of the receiver CSE and an M2M service provider's identifier of the receiver CSE.

Preferably, the originator CSE is further configured to: after receiving the CSE resource creation response message sent by the receiver CSE, detect whether there is already a resource corresponding to the identifier of the receiver CSE in local;

if there is already the resource corresponding to the identifier of the receiver CSE in the local area of the originator CSE, generate a CSE resource creation response message indicating that the resource already exists or the resource creation is successful and send the message to the receiver CSE;

if there is no resource corresponding to the identifier of the receiver CSE in the local area of the originator CSE, create a resource for the receiver CSE, and save the type of the receiver CSE as an attribute, generate a CSE resource creation response message indicating that the resource creation is successful and send the message to the receiver CSE.

Preferably, the originator CSE is further configured to: if the CSE resource creation request message sent by the receiver CSE comprises the M2M service provider's identifier of the receiver CSE, compare the received M2M service provider's identifier of the receiver CSE with the M2M service provider's identifier of the originator CSE with a local attribute;

when a comparison result is that the received M2M service provider's identifier of the receiver CSE and the M2M service provider's identifier of the originator CSE with a local attribute are the same, create a resource for the receiver CSE, set a resource name according to the identifier of the receiver CSE and save the type of the receiver CSE as an attribute, generate a CSE resource creation response message indicating that the resource creation is successful and send the message to the receiver CSE;

when the comparison result is that the received M2M service provider's identifier of the receiver CSE and the M2M service provider's identifier of the originator CSE with a local attribute are different, generate a CSE resource creation response message indicating that the resource creation is failed and send the message to the receiver CSE.

Preferably, the receiver CSE is further configured that: after receiving the CSE resource creation response message sent by the originator CSE, if the CSE resource creation response message indicates that the resource creation is successful or the resource already exists, then complete a registration;

if the CSE resource creation response message indicates that the resource creation is failed, delete the resource created for the originator CSE.

The embodiment of the present document provides a registration method and system for the common service entity, the originator CSE sends a CSE resource creation request message to the receiver CSE, the CSE resource creation request message comprises: the identifier of the originator CSE and the type of the originator CSE, or, the identifier of the originator CSE, the type of the originator CSE and the M2M service provider's identifier of the originator CSE; the receiver CSE detects whether there is a resource corresponding to the identifier of the originator CSE in local, creates a resource for the originator CSE if there is no resource corresponding to the identifier of the originator CSE in local, sets a resource name according to the identifier of the originator CSE, and saves the type of the originator CSE as an attribute, generates a CSE resource creation response message indicating that the resource creation is successful, and sends the CSE resource creation response message to the originator CSE. It achieves the registration between the CSEs, and solves the problem that the CSE registration mechanism cannot achieve the application interactive function.

PREFERRED EMBODIMENTS

With the expansion of the M2M service, it is possible that different applications need to interact, for example, in addition to enjoying smart home appliances online troubleshooting and maintenance services provided by smart appliances companies, the smart appliances can also enjoy online movie services provided by other video service providers.

The existing CSE registration mechanism cannot achieve the application interactive function.

To solve the abovementioned problems, the embodiments of the present document provide a registration method for common service entity. Hereinafter in conjunction with the accompanying drawings, embodiments of the present document will be described in detail. It should be noted that, in the case of no conflict, embodiments and features in the embodiments of the present application may be arbitrarily combined with each other.

The First Embodiment:

The present document provides a registration method for common service entity, and a process of using this method to complete the registration between the CSEs is as follows:

1. The CSE actively initiating a registration request in the present embodiment is called an originator CSE, and the CSE to which it needs to register is called a receiver CSE.

2. The originator CSE sends a CSE resource creation request to the receiver CSE, the CSE resource creation request message comprises:

1) Originator-CSE-ID: required, the identifier of the originator CSE;

2) Originator-CSE-type: required, the type of the originator CSE.

Depending on different nodes in which the CSEs introduced in the background art are located, their types are divided into application service nodes ("ASN"), intermediate nodes ("MN"), and Infrastructure Nodes ("IN").

3. The receiver CSE performs operations according to the type of the originator CSE, the Originator-CSE-type and the type of the receiver CSE, the Receiver-CSE-type.

4. If the value of the Receiver-CSE-type is "MN", the value of the Originator-CSE-type is "ASN";

or the value of the Receiver-CSE-type is "IN", and the value of the Originator-CSE-type is "ASN";

or, the value of the Receiver-CSE-type is "IN", and the value of the Originator-CSE-type is "MN".

4.1. The receiver CSE detects whether there is a CSE resource corresponding to the Originator-CSE-ID in local, and if there is, it sends a CSE resource creation response message to the originator CSE, the response message comprises:

an indication that the resource creation is failed;

and if there is no CSE resource corresponding to the Originator-CSE-ID, the receiver CSE creates a CSE resource for the originator CSE, sets a resource name based on the Originator-CSE-ID and saves the Originator-CSE-type as an attribute of the resource.

The receiver CSE sends the CSE resource creation response message to the originator CSE, wherein the response message comprises:

1) the indication that the resource creation is successful;
2) the identifier of the receiver CSE (Receiver-CSE-ID);
3) the type of the receiver CSE (Receiver-CSE-type).

Note: setting the resource name according to the Originator-CSE-ID refers to that, it may directly use the Originator-CSE-ID to set the resource name, or use the Originator-CSE-ID plus a prefix or suffix to set the resource name, or use the Originator-CSE-ID as a basis to encode to set the resource name.

If the value of the Receiver-CSE-type of the receiver CSE is "IN", the response message may further comprise:

4) Receiver-M2M-SP-ID: it is used for identifying the M2M service provider that it belongs to.

4.2. After the originator CSE receives the CSE resource creation response message, if the response message comprises an indication that the resource creation is successful, the originator CSE creates the CSE resource for the receiver CSE in local, the resource name is set according to the Receiver-CSE-ID, and the Receiver-CSE-type is saved as an attribute of the resource.

If the response message comprises the "Receiver-M2M-SP-ID", the value of the local attribute "M2M-SP-ID" is set to the value of the "Receiver-M2M-SP-ID";

or, the value of the local attribute "M2M-SP-ID" and the value of the attribute "M2M-SP-ID" of the resource created for the receiver CSE are as the value of the "Receiver-M2M-SP-ID" at the same time.

5. If the value of the Receiver-CSE-type is "MN", the value of the Originator-CSE-type is "MN", or the value of the Receiver-CSE-type is "IN", and the value of the Originator-CSE-type is "IN".

5.1. The receiver CSE detects whether there is the CSE resource corresponding to the Originator-CSE-ID in local, if there already is, then it sends a CSE resource creation response message to the originator CSE, the response message comprises:

an indication that the resource creation is failed;

if there is no CSE resource corresponding to the Originator-CSE-ID, the receiver CSE creates a CSE resource for the originator CSE, sets a resource name according to the Originator-CSE-ID and saves the Originator-CSE-type as an attribute of the resource.

The receiver CSE sends a CSE resource creation response message to the originator CSE, wherein the response message comprises:

an indication that the resource creation is successful;

after sending the CSE resource creation response, the receiver CSE sends a CSE resource creation request to the originator CSE, the request message comprises:

1) the identifier of the receiver CSE (Receiver-CSE-ID);
2) the type of the receiver CSE (Receiver-CSE-type).

5.2. After the originator CSE receives the CSE resource creation response message, if the response message comprises an indication that the resource creation is successful, then after receiving the CSE resource creation request message sent by the CSE receiver, the originator CSE detects whether there is the CSE resource corresponding to the Receiver-CSE-ID in local, if there already is, then it sends the CSE resource creation response message to the receiver CSE, wherein the response message comprises:

an indication that the resource already exists or an indication that the resource creation is successful;

if there is no CSE resource corresponding to the Receiver-CSE-ID, the originator CSE creates the CSE resource for the receiver CSE, sets the resource name according to the Receiver-CSE-ID, and saves the Receiver-CSE-type as an attribute of the resource.

The originator CSE sends the CSE resource creation response message to the receiver CSE, wherein the response message comprises:

an indication that the resource creation is successful.

If there is one of the following reasons causing that the CSE resource creation is failed:

A: according to the identifier of the receiver CSE and local policies of the originator CSE, the receiver CSE is not allowed to create a resource;

B: the receiver CSE fails to pass the security authentication;

C: information provided by the receiver CSE is wrong;

D: Other possible errors;

then, the originator CSE sends the CSE resource creation response message to the receiver, the response message comprises:

an indication that the resource creation is failed.

5.3. After the receiver CSE receives the CSE resource creation response message, if the response message comprises an indication that the resource creation is successful or the resource already exists, the registration is completed; if the response message comprises an indication that the resource creation is failed, the receiver CSE deletes the resource created for the originator CSE in local.

The Second Embodiment

The present document provides a registration method for common service entity, and a process of using this method to complete the registration between the CSEs is as follows:

1. The CSE actively initiating a registration request in the present embodiment is called an originator CSE, and the CSE to which it needs to register is called a receiver CSE.

2. The originator CSE sends a CSE resource creation request to the receiver CSE, the request message comprises:

1) Originator-CSE-ID: required, the identifier of the originator CSE;

2) Originator-CSE-type: required, the type of the originator CSE.

Depending on different nodes where the CSEs introduced in the background art are located, their types are divided into application service nodes ("ASN"), intermediate nodes ("MN"), and Infrastructure Nodes ("IN").

3. The receiver CSE performs operations according to the type of the originator CSE, i.e. the Originator-CSE-type and the type of the receiver CSE, the Receiver-CSE-type.

4. If the value of the Receiver-CSE-type is "MN", the value of the Originator-CSE-type is "ASN";

or the value of the Receiver-CSE-type is "IN", the value of the Originator-CSE-type is "ASN";

or, the value of the Receiver-CSE-type is "IN", the value of the Originator-CSE-type is "MN".

4.1. The receiver CSE detects whether there is a CSE resource corresponding to the Originator-CSE-ID in local, and if there already is, sends a CSE resource creation response message to the originator CSE, the response message comprises:

an indication that the resource creation is failed;

if there is no CSE resource corresponding to the Originator-CSE-ID, the receiver CSE creates the CSE resource for the originator CSE, sets the resource name according to the Originator-CSE-ID and saves the Originator-CSE-type as an attribute of the resource, and sets the attribute "online state" value of the resource to be "online".

The receiver CSE sends the CSE resource creation response message to the originator CSE, the response message comprises:

1) the indication that the resource creation is successful;

2) the identifier of the receiver CSE (Receiver-CSE-ID);

3) the type of the receiver CSE (Receiver-CSE-type).

Note: setting the resource name according to the Originator-CSE-ID refers to that, it may directly use the Originator-CSE-ID to set the resource name, or use the Originator-CSE-ID with a prefix or suffix to set the resource name, or use the Originator-CSE-ID as a basis to encode to set the resource name.

4.2. After the originator CSE receives the CSE resource creation response message, if the response message comprises an indication that the resource creation is successful, the originator CSE creates the CSE resource for the receiver CSE in local, sets the resource name according to the Receiver-CSE-ID, saves the Receiver-CSE-type as an attribute of the resource, and sets the attribute "online state" value of the resource to be "online".

5. If the value of the Receiver-CSE-type is "MN", the value of the Originator-CSE-type is "MN", Or the value of the Receiver-CSE-type is "IN", and the value of the Originator-CSE-type is "IN".

5.1. The receiver CSE detects whether there is a CSE resource corresponding to the Originator-CSE-ID in local, if there already is, it sends a CSE resource creation response message to the originator CSE, the response message comprises:

an indication that the resource creation is failed;

If there is no CSE resource corresponding to the Originator-CSE-ID, creates the CSE resource for the originator CSE, the receiver CSE sets the resource name according to the Originator-CSE-ID and saves the Originator-CSE-type as an attribute of the resource, and sets the attribute "online state" value of the resource to be "online".

The receiver CSE sends a CSE resource creation response message to the originator CSE, the response message comprises:

an indication that the resource creation is successful.

After sending the CSE resource creation response, the receiver CSE sends a CSE resource creation request to the originator CSE, the request message comprises:

1) the identifier of the receiver CSE (Receiver-CSE-ID);

2) the type of the receiver CSE (Receiver-CSE-type).

5.2. After the originator CSE receives the CSE resource creation response message, if the response message comprises an indication that the resource creation is successful, then after receiving the CSE resource creation request message sent by the receiver CSE, the originator CSE detects whether there is the CSE resource corresponding to the Receiver-CSE-ID in local, if there already is, it sends the CSE resource creation response message to the receiver CSE, the response message comprises:

an indication that the resource already exists or an indication that the resource creation is successful.

If there is no CSE resource corresponding to the Receiver-CSE-ID, the originator CSE creates the CSE resource for the receiver CSE, sets the resource name according to the Receiver-CSE-ID, saves the Receiver-CSE-type as an attribute of the resource, and sets the attribute "online state" value of the resource to be "online".

The originator CSE sends the CSE resource creation response message to the receiver CSE, the response message comprises:

an indication that the resource creation is successful.

If there is one of the following reasons causing that the CSE resource creation is failed:

A: according to the identifier of the receiver CSE and local policies of the originator CSE, the receiver CSE is not allowed to create a resource;

B: the receiver CSE fails to pass the security authentication;

C: information provided by the receiver CSE is wrong;

D: other possible errors;

then, the originator CSE sends the CSE resource creation response message to the receiver, the response message comprises:

an indication that the resource creation is failed.

5.3. After the receiver CSE receives the CSE resource creation response message, if the response message comprises the indication that the resource creation is successful or the resource already exists, the registration is completed; if the CSE resource creation response message indicates that the resource creation is failed, the receiver CSE deletes the CSE resource created for the originator CSE in local.

The Third Embodiment

The present document provides a registration method for common service entity, and a process of using this method to complete the registration between the CSEs is as follows:

1. The CSE actively initiating a registration request in the present embodiment is called an originator CSE, and the CSE to which it needs to register is called a receiver CSE.

2. The originator CSE sends a CSE resource creation request to the receiver CSE, the request message comprises:

1) Originator-CSE-ID: required, the identifier of the originator CSE;

2) Originator-CSE-type: required, the type of the originator CSE.

Depending on different nodes where the CSEs introduced in the background art are located, their types are divided into application service nodes ("ASN"), intermediate nodes ("MN"), and infrastructure nodes ("IN").

3. The receiver CSE performs operations according to the type of the originator CSE, the Originator-CSE-type and the type of the receiver CSE, the Receiver-CSE-type.

4. If the value of the Receiver-CSE-type is "MN", the value of the Originator-CSE-type is "ASN";

or the value of the Receiver-CSE-type is "IN", the value of the Originator-CSE-type is "ASN";

or, the value of the Receiver-CSE-type is "IN", the value of the Originator-CSE-type is "MN".

4.1. The receiver CSE detects whether there is a CSE resource corresponding to the Originator-CSE-ID in local, and if there already is, it sends a CSE resource creation response message to the originator CSE, the response message comprises:

the indication that the resource creation is failed;

if there is no CSE resource corresponding to the Originator-CSE-ID, the receiver CSE creates a CSE resource for the originator CSE, sets the resource name according to the Originator-CSE-ID and saves the Originator-CSE-type as an attribute of the resource.

The receiver CSE sends the CSE resource creation response message to the originator CSE, the response message comprises:

1) the indication that the resource creation is successful;
2) the identifier of the receiver CSE (Receiver-CSE-ID);
3) the type of the receiver CSE (Receiver-CSE-type).

Note: setting the resource name according to the Originator-CSE-ID means that it may directly use the Originator-CSE-ID to set the resource name, or use the Originator-CSE-ID with a prefix or suffix to set the resource name, or use the Originator-CSE-ID as a basis to encode to set the resource name.

4.2. After the originator CSE receives the CSE resource creation response message, if the response message comprises an indication that the resource creation is successful, the originator CSE creates the CSE resource for the receiver CSE in local, sets the resource name according to the Receiver-CSE-ID, and saves the Receiver-CSE-type as an attribute of the resource.

5. If the value of the Receiver-CSE-type is "MN", the value of the Originator-CSE-type is "MN", or the value of the Receiver-CSE-type is "IN", and the value of the Originator-CSE-type is "IN".

5.1. The receiver CSE detects whether there is a CSE resource corresponding to the Originator-CSE-ID in local, if there already is, sends the CSE resource creation response message to the originator CSE, the response message comprises:

the indication that the resource creation is failed;

if there is no CSE resource corresponding to the Originator-CSE-ID, the receiver CSE creates the CSE resource for the originator CSE, sets the resource name according to the Originator-CSE-ID and saves the Originator-CSE-type as an attribute of the resource.

The receiver CSE sends a CSE resource creation response message to the originator CSE, the response message comprises:

the indication that the resource creation is successful.

After sending the CSE resource creation response, the receiver CSE sends a CSE resource creation request to the originator CSE, the request message comprises:

1) the identifier of the receiver CSE (Receiver-CSE-ID);
2) the type of the receiver CSE (Receiver-CSE-type).

Meanwhile, the receiver CSE starts a waiting timer T.

5.2. After the originator CSE receives the CSE resource creation response message, if the response message comprises an indication that the resource creation is successful, then after receiving the CSE resource creation request message sent by the receiver CSE, the originator CSE detects whether there is the CSE resource corresponding to the Receiver-CSE-ID in local, and if there already is, it sends the CSE resource creation response message to the receiver CSE, the response message comprises:

an indication that the resource already exists or an indication that the resource creation is successful;

if there is no CSE resource corresponding to the Receiver-CSE-ID, the originator CSE creates a CSE resource for the receiver CSE, sets the resource name according to the Receiver-CSE-ID, and saves the Receiver-CSE-type as an attribute of the resource.

The originator CSE sends the CSE resource creation response message to the receiver CSE, the response message comprises:

an indication that the resource creation is successful.

If there is one of the following reasons causing that the CSE resource creation is failed:

A: according to the identifier of the receiver CSE and local policies of the originator CSE, the receiver CSE is not allowed to create a resource;

B: the receiver CSE fails to pass the security authentication;

C: information provided by the receiver CSE is wrong;

D: other possible errors;

then, the originator CSE sends the CSE resource creation response message to the receiver, the response message comprises:

an indication that the resource creation is failed.

5.3. After the receiver CSE receives the CSE resource creation response message sent by the originator CSE, if the response message comprises an indication that the resource creation is successful or the resource already exists, the registration is completed; if the CSE resource creation response message indicates that the resource creation is failed, the receiver CSE deletes the CSE resource created for the originator CSE in local.

If the CSE resource creation response message is still not received when the waiting timer T expires, the resource created for the originator CSE in local would be deleted.

The Fourth Embodiment

The present document provides a registration method for common service entity, and a process of using this method to complete the registration between the CSEs is as follows:

1. The CSE actively initiates a registration request in the present embodiment is called an originator CSE, and the CSE to which it needs to register is called a receiver CSE.

2. The originator CSE sends a CSE resource creation request to the receiver CSE, the request message comprises:

1) Originator-CSE-ID: required, the identifier of the originator CSE;

2) Originator-CSE-type: required, the type of the originator CSE.

Depending on different nodes where the CSEs introduced in the background art are located, their types are divided into application service nodes ("ASN"), intermediate nodes ("MN"), and infrastructure nodes ("IN").

3) Originator-M2M-SP-ID: used to identify the M2M service provider to which the present CSE belongs.

3. The receiver CSE performs operations according to the type of the originator CSE, the Originator-CSE-type and the type of the receiver CSE, the Receiver-CSE-type.

4. If the value of the Receiver-CSE-type is "MN", the value of the Originator-CSE-type is "ASN";

or the value of the Receiver-CSE-type is "IN", the value of the Originator-CSE-type is "ASN";

or the value of the Receiver-CSE-type is "IN", the value of the Originator-CSE-type is "MN".

4.1. The receiver CSE detects whether there is a CSE resource corresponding to the Originator-CSE-ID in local, if there already is, the receiver CSE sends a CSE resource creation response message to the originator CSE, the response message comprises:

an indication that the resource creation is failed;

if there is no CSE resource corresponding to the Originator-CSE-ID, the receiver CSE creates a CSE resource for the originator CSE, sets the resource name according to the Originator-CSE-ID and saves the Originator-CSE-type as an attribute of the resource.

the receiver CSE sends the CSE resource creation response message to the originator CSE, the response message comprises:

1) the indication that the resource creation is successful;
2) the identifier of the receiver CSE (Receiver-CSE-ID);
3) the type of the receiver CSE (Receiver-CSE-type).

Note: setting the resource name according to the Originator-CSE-ID means that, it may directly use the Originator-CSE-ID to set the resource name, or use the Originator-CSE-ID with a prefix or suffix to set the resource name, or use the Originator-CSE-ID as a basis to encode to set the resource name.

4.2. After the originator CSE receives the CSE resource creation response message, if the response message comprises the indication that the resource creation is successful, the originator CSE creates the CSE resource for the receiver CSE in local, sets the resource name according to the Receiver-CSE-ID, and saves the Receiver-CSE-type as an attribute of the resource.

5. If the value of the Receiver-CSE-type is "MN", the value of the Originator-CSE-type is "MN";

5.1. The receiver CSE detects whether there is a CSE resource corresponding to the Originator-CSE-ID in local, and if there already is, it sends a CSE resource creation response message to the originator CSE, the response message comprises:

the indication that the resource creation is failed;

and if there is no CSE resource corresponding to the Originator-CSE-ID, and if the Originator-M2M-SP-ID in the CSE resource creation request and the attribute Receiver-M2M-SP-ID of the receiver CSE are the same, the receiver CSE creates the CSE resource for the originator CSE, sets the resource name according to the Originator-CSE-ID and saves the Originator-CSE-type as an attribute of the resource.

The receiver CSE sends a CSE resource creation response message to the originator CSE, the response message comprises:

the indication that the resource creation is successful.

after sending the CSE resource creation response, the receiver CSE sends a CSE resource creation request to the originator CSE, the request message comprises:

1) the identifier of the receiver CSE (Receiver-CSE-ID);
2) the type of the receiver CSE (Receiver-CSE-type);
3) Receiver-M2M-SP-ID: used to identify the M2M service provider to which the present CSE belongs.

If the CSE resource creation request does not comprise the Originator-M2M-SP-ID, or comprises the Originator-M2M-SP-ID, but the Originator-M2M-SP-ID is different from the Receiver-M2M-SP-ID, the attribute of the receiver CSE, the receiver CSE sends a CSE resource creation response message to the originator CSE, and the response message comprises:

the indication that the CSE resource creation is failed.

5.2. After the originator CSE receives the CSE resource creation response message, if the response message comprises the indication that the resource creation is successful, then after receiving the CSE resource creation request message sent by the CSE receiver, the originator CSE detects whether there is the CSE resource corresponding to the Receiver-CSE-ID in local, and if there already is, sends the CSE resource creation response message to the receiver CSE, the response message comprises:

the indication that the resource already exists;

and if there is no CSE resource corresponding to the Receiver-CSE-ID, the originator CSE creates the CSE resource for the receiver CSE, sets the resource name according to the Receiver-CSE-ID, and saves the Receiver-CSE-type as an attribute of the resource.

The originator CSE sends the CSE resource creation response message to the receiver CSE, the response message comprises:

the indication that the resource creation is successful.

If there is one of the following reasons causing that the CSE resource creation is failed:

A: according to the identifier of the receiver CSE and local policies of the originator CSE, the receiver CSE is not allowed to create a resource;

B: the receiver CSE fails to pass the security authentication;

C: information provided by the receiver CSE is wrong;

D: Other possible errors;

then, the originator CSE sends a CSE resource creation response message to the receiver, the response message comprises:

the indication that the resource creation is failed.

5.3. After the receiver CSE receives the CSE resource creation response message, if the response message comprises the indication that the resource creation is successful or the resource already exists, the registration is completed;

if the response message comprises the indication that the resource creation is failed, the CSE resource created for the originator CSE in local is deleted.

6. If the value of the Receiver-CSE-type is "IN", the value of the Originator-CSE-type is "IN";

6.1. The receiver CSE detects whether there is a CSE resource corresponding to the Originator-CSE-ID in local, and if there already is, it sends a CSE resource creation response message to the originator CSE, the response message comprises:

the indication that the resource creation is failed;

and if there is no CSE resource corresponding to the Originator-CSE-ID, the receiver CSE creates the CSE resource for the originator CSE, sets the resource name according to the Originator-CSE-ID and saves the Originator-CSE-type as an attribute of the resource.

The receiver CSE sends a CSE resource creation response message to the originator CSE, the response message comprises:

the indication that the resource creation is successful.

After sending the CSE resource creation response, the receiver CSE sends a CSE resource creation request to the originator CSE, the request message comprises:

1) the identifier of the receiver CSE (Receiver-CSE-ID);
2) the type of receiver CSE (Receiver-CSE-type).

6.2. After the originator CSE receives the CSE resource creation response message, if the response message comprises the indication that the resource creation is successful, then after receiving the CSE resource creation request message sent by the CSE receiver, the originator CSE detects whether there is the CSE resource corresponding to the Receiver-CSE-ID in local, if there already is, it sends a CSE resource creation response message to the receiver CSE, the response message comprises:

the indication that the resource already exists or the CSE resource creation is successful;

and if there is no CSE resource corresponding to the Receiver-CSE-ID, the originator CSE creates the CSE resource for the receiver CSE, sets the resource name according to the Receiver-CSE-ID, and saves the Receiver-CSE-type as an attribute of the resource.

The originator CSE sends the CSE resource creation response message to the receiver CSE, the response message comprises:

the indication that the resource creation is successful.

If there is one of the following reasons causing that the CSE resource creation is failed:

A: according to the identifier of the receiver CSE and local policies of the originator CSE, the receiver CSE is not allowed to create a resource;

B: the receiver CSE fails to pass the security authentication;

C: information provided by the receiver CSE is wrong;

D: other possible errors;

then, the originator CSE sends a CSE resource creation response message to the receiver, the response message comprises:

the indication that the resource creation is failed.

6.3. After the receiver CSE receives the CSE resource creation response message sent by the originator CSE, if the response message comprises the indication that the resource creation is successful or the resource already exists, the registration is completed; if the response message comprises the indication that the resource creation is failed, the CSE resource created for the originator CSE in local is deleted.

The Fifth Embodiment

The present document provides a registration method for common service entity, and a process of using this method to complete the registration between the CSEs is as follows:

1. The CSE actively initiating a registration request in the present embodiment is called an originator CSE, and the CSE to which it needs to register is called a receiver CSE.

2. The originator CSE sends a CSE resource creation request to the receiver CSE, wherein the request message comprises:

1) Originator-CSE-ID: required, the identifier of the originator CSE;
2) Originator-CSE-type: required, the type of the originator CSE.

Depending on different nodes where the CSEs introduced in the background art are located, their types are divided into application service nodes ("ASN"), intermediate nodes ("MN"), and infrastructure nodes ("IN").

3) Originator-M2M-SP-ID: optional, used to identify the M2M service provider to which the present CSE belongs.

3. The receiver CSE performs operations according to the type of the originator CSE, the Originator-CSE-type and the type of the receiver CSE, the Receiver-CSE-type.

4. If the value of the Receiver-CSE-type is "MN", the value of the Originator-CSE-type is "ASN";

or the value of the Receiver-CSE-type is "IN", and the value of the Originator-CSE-type is "ASN";

or the value of the Receiver-CSE-type is "IN", and the value of the Originator-CSE-type is "MN".

4.1. The receiver CSE detects whether there is the CSE resource corresponding to the Originator-CSE-ID in local, and if there already is, it sends a CSE resource creation response message to the originator CSE, the response message comprises:

the indication that the resource creation is failed;

and if there is no CSE resource corresponding to the Originator-CSE-ID, the receiver CSE creates the CSE resource for the originator CSE, sets the resource name according to the Originator-CSE-ID and saves the Originator-CSE-type as an attribute of the resource.

The receiver CSE sends a CSE resource creation response message to the originator CSE, the response message comprises:

1) the indication that the resource creation is successful;
2) the identifier of the receiver CSE (Receiver-CSE-ID);
3) the type of the receiver CSE (Receiver-CSE-type).

Note: setting the resource name according to the Originator-CSE-ID means that, it may directly use the Originator-CSE-ID to set the resource name, or use the Originator-CSE-ID with a prefix or suffix to set the resource name, or use the Originator-CSE-ID as a basis to encode to set the resource name.

4.2. After the originator CSE receives the CSE resource creation response message, if the response message comprises the indication that the resource creation is successful, the originator CSE creates the CSE resource for the receiver CSE in local, sets the resource name according to the Receiver-CSE-ID, and saves the Receiver-CSE-type as an attribute of the resource.

5. If the value of the Receiver-CSE-type is "MN", the value of the Originator-CSE-type is "MN", 5.1. If the CSE resource creation request comprises the Originator-M2M-SP-ID, and it is the same with the attribute of the receiver CSE, Receiver-M2M-SP-ID, the receiver CSE detects whether there is a CSE resource corresponding to the Originator-CSE-ID in local, if there already is, it sends a CSE resource creation response message to the originator CSE, the response message comprises:

the indication that the resource creation is failed;

and if there is no CSE resource corresponding to the Originator-CSE-ID, the receiver CSE creates the CSE resource for the originator CSE, sets the resource name according to the Originator-CSE-ID and saves the Originator-CSE-type as an attribute of the resource.

The receiver CSE sends a CSE resource creation response message to the originator CSE, the response message comprises:

1) the indication that the resource creation is successful;
2) the identifier of the receiver CSE (Receiver-CSE-ID);
3) the type of receiver CSE (Receiver-CSE-type);

If the CSE resource creation request does not comprise the Originator-M2M-SP-ID, or comprises the Originator-M2M-SP-ID, but the Originator-M2M-SP-ID is different from the attribute of the receiver CSE, Receiver-M2M-SP-ID, the receiver CSE sends a CSE resource creation response message to the originator CSE, the response message comprises:

the indication that the CSE resource creation is failed.

5.2. After the originator CSE receives the CSE resource creation response message, if the response message comprises the indication that the resource creation is successful, the originator CSE creates the CSE resource for the receiver CSE in local, sets the resource name according to the Originator-CSE-ID and saves the Originator-CSE-type as an attribute of the resource.

6. If the value of the Receiver-CSE-type is "IN", the value of the Originator-CSE-type is "IN":

6.1. The receiver CSE detects whether there is the CSE resource corresponding to the Originator-CSE-ID in local, and if there already is, it sends a CSE resource creation response message to the originator CSE, the response message comprises:

the indication that the resource creation is failed;

and if there is no CSE resource corresponding to the Originator-CSE-ID, the receiver CSE creates the CSE resource for the originator CSE, sets the resource name according to the Originator-CSE-ID and saves the Originator-CSE-type as an attribute of the resource.

The receiver CSE sends a CSE resource creation response message to the originator CSE, the response message comprises:

the indication that the resource creation is successful.

After sending the CSE resource creation response, the receiver CSE sends a CSE resource creation request to the originator CSE, the request message comprises:

1) the identifier of the receiver CSE (Receiver-CSE-ID);
2) the type of the receiver CSE (Receiver-CSE-type);

6.2. After the originator CSE receives the CSE resource creation response message, if the response message comprises the indication that the CSE resource creation is successful, then after receiving the CSE resource creation request message sent by the receiver CSE, the originator CSE detects whether there is the CSE resource corresponding to the Receiver-CSE-ID in local, and if there already is, it sends a CSE resource creation response message to the receiver CSE, the response message comprises:

the indication that the resource already exists or the CSE resource creation is successful;

and if there is no CSE resource corresponding to the Receiver-CSE-ID, the originator CSE creates the CSE resource for the receiver CSE, sets the resource name according to the Receiver-CSE-ID, and saves the Receiver-CSE-type as an attribute of the resource.

The originator CSE sends the CSE resource creation response message to the receiver CSE, the response message comprises:

the indication that the resource creation is successful.

if there is one of the following reasons causing that the CSE resource creation is failed:

A: according to the identifier of the receiver CSE and local policies of the originator CSE, the receiver CSE is not allowed to create a resource;

B: the receiver CSE fails to pass the security authentication;

C: information provided by the receiver CSE is wrong;

D: Other possible errors;

then, the originator CSE sends a CSE resource creation response message to the receiver, the response message comprises:

the indication that the resource creation is failed.

6.3. After the receiver CSE receives the CSE resource creation response message, if the response message comprises the indication that the resource creation is successful or the resource already exists, the registration is completed;

if the response message comprises the indication that the CSE resource creation is failed, the receiver CSE deletes the CSE resource created for the originator CSE in local.

The Sixth Embodiment

Figure 2:
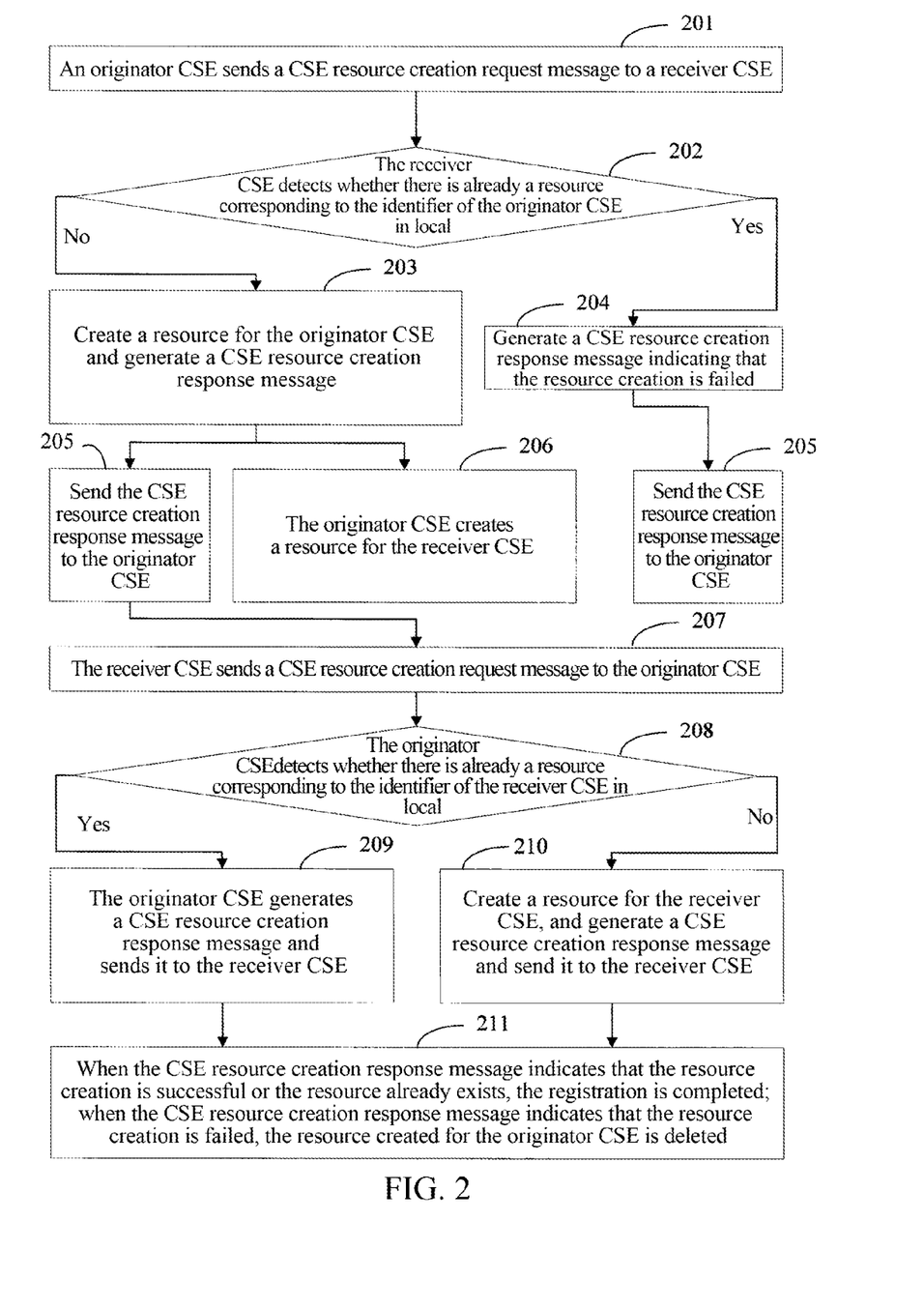
FIG. 2 is a flow chart of a registration method for a common service entity provided in the sixth embodiment of the present document.

The embodiment of the present document provides a registration method for common service entity, and a process of using this method to complete the registration between the CSEs is shown in FIG. 2, comprising:

in step 201, the originator CSE sends a CSE resource creation request message to the receiver CSE, the CSE resource creation request message comprises:

an identifier of the originator CSE and a type of the originator CSE, or, an identifier of the originator CSE, a type of the originator CSE, and an M2M service provider's identifier of the originator CSE.

In step 202, the receiver CSE detects whether there is a resource corresponding to the identifier of the originator CSE in local;

different procedures are executed according to a judgment result, and if the judgment result is that there is a resource, the process proceeds to step 204; otherwise, it proceeds to step 203.

In step 203, the receiver CSE creates a resource for the originator CSE when there is no resource corresponding to the identifier of the originator CSE in local, sets the resource name according to the identifier of the originator CSE, saves the type of the originator CSE as an attribute, and generates a CSE resource creation response message indicating that the resource creation is successful;

specifically, when the CSE resource creation request message comprises the M2M service provider's identifier of the originator CSE, when there is no resource corresponding to the identifier of the originator CSE in local, the receiver CSE compares the received M2M service provider's identifier of the originator CSE with the M2M service provider's identifier of the receiver CSE with a local attribute;

when the M2M service provider's identifier of the originator CSE and the M2M service provider's identifier of the receiver CSE with a local attribute are the same, the process proceeds to step 206, the receiver CSE creates the resource for the originator CSE, sets the resource name according to the identifier of the originator CSE and saves the type of the originator CSE as an attribute, and generates a CSE resource creation response message indicating that the resource creation is successful.

When the M2M service provider's identifier of the originator CSE and the M2M service provider's identifier of the receiver CSE with the local attribute are different, the process proceeds to step 205, the receiver CSE generates a CSE resource creation response message indicating that the resource creation is failed.

In step 204, when there is the resource corresponding to the identifier of the originator CSE in local, the receiver CSE generates a CSE resource creation response message indicating that the resource creation is failed.

In step 205, the receiver CSE sends the CSE resource creation response message to the originator CSE.

The CSE resource creation response message comprises:
the indication that the resource creation is failed; or,
the indication that the resource creation is successful; or,
the indication that the resource creation is successful, the identifier of the receiver CSE and the type of the receiver CSE; or,
the indication that the resource creation is successful, the identifier of the receiver CSE, the type of the receiver CSE, and the M2M service provider's identifier of the receiver CSE.

In step 206, the originator CSE creates the resource for the receiver CSE, sets the resource name according to the identifier of the receiver CSE, and saves the type of the receiver CSE as an attribute;

In this step, when the CSE resource creation response message sent by the originator CSE to the receiver CSE indicates that the resource creation is successful, that is, the resource is created for the receiver CSE, the originator CSE sets the resource name according to the identifier of the receiver CSE, and saves the type of the receiver CSE as an attribute.

Specifically, when the CSE resource creation response message comprises the M2M service provider's identifier of the receiver CSE, the originator CSE sets the M2M service provider's identifier of the receiver CSE as a local attribute to save, or,
sets the M2M service provider's identifier of the receiver CSE as a local attribute and as an attribute of the resource created for the receiver CSE to save.

In step 207, after sending the CSE resource creation response message indicating that the resource creation is successful, the receiver CSE sends a CSE resource creation request message to the originator CSE, the CSE resource creation request message comprises:
the identifier of the receiver CSE and the type of the receiver CSE, or,
the identifier of the receiver CSE, the type of the receiver CSE and the M2M service provider's identifier of the receiver CSE.

In step 208, after the originator CSE receives the CSE resource creation response message sent by the receiver CSE, the originator CSE detects whether there is the resource corresponding to the identifier of the receiver CSE in local;
according to the detection result, if it is detected that there is already the resource in local, the process proceeds to step 209, otherwise, it proceeds to step 210.

In step 209, when there is already the resource corresponding to the identifier of the receiver CSE in the local area of the originator CSE, the originator CSE generates a CSE resource creation response message indicating that the resource already exists or the resource creation is successful and sends it to the receiver CSE.

In step 210, when there is no resource corresponding to the identifier of the receiver CSE in the local area of the originator CSE, the originator CSE creates the resource for the receiver CSE, saves the type of the receiver CSE as an attribute, and generates a CSE resource creation response message indicating that the resource creation is successful and sends it to the receiver CSE.

Specifically, when the CSE resource creation request message sent by the receiver CSE comprises the M2M service provider's identifier of the receiver CSE, after the step of, after the originator CSE receives the CSE resource creation response message sent by the receiver CSE, the originator CSE detecting whether there is the resource corresponding to the identifier of the receiver CSE in local, the originator CSE further compares the received M2M service provider's identifier of the receiver CSE with the M2M service provider's identifier of the originator CSE with the local attribute, when the comparison result is that the received M2M service provider's identifier of the receiver CSE and the M2M service provider's identifier of the originator CSE with the local attribute are the same, the originator CSE creates the resource for the receiver CSE, sets the resource name according to the identifier of the receiver CSE and saves the type of the receiver CSE as an attribute, generates a CSE resource creation response message indicating that the resource creation is successful and sends it to the receiver CSE;

when the comparison result is that the received M2M service provider's identifier of the receiver CSE and the M2M service provider's identifier of the originator CSE with the local attribute are different, the originator CSE generates a CSE resource creation response message indicating that the resource creation is failed and sends it to the receiver CSE.

In step 211, after the receiver CSE receives the CSE resource creation response message sent by the originator CSE,
when the CSE resource creation response message indicates that the resource creation is successful or the resource already exists, then the registration is completed;
when the CSE resource creation response message indicates that the resource creation is failed, the receiver CSE deletes the resource created for the originator CSE.

Preferably, the receiver CSE starts a waiting timer when sending the CSE resource creation request message. If the receiver CSE still does not receive the CSE resource creation response message sent by the originator CSE when the waiting timer expires, the receiver CSE deletes the resource created for the originator CSE.

Preferably, for the originator CSE or the receiver CSE, after creating the resource, the attribute "Online Status" value of the resource is set to be "Online".

Figure 3:
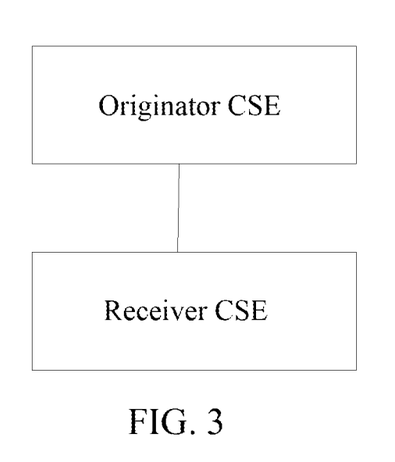
FIG. 3 is a schematic diagram of a registration system for the common service entity in accordance with an embodiment of the present document.

The embodiment of the present document further provides a registration system for common service entity, as shown in FIG. 3, it comprises an originator CSE and a receiver CSE;
the originator CSE is used to send a CSE resource creation request message to the receiver CSE, the CSE resource creation request message comprises:
the identifier of the originator CSE and the type of the originator CSE, or,
the identifier of the originator CSE, the type of the originator CSE, and the M2M service provider's identifier of the originator CSE;
the receiver CSE is used to: detect whether there is the resource corresponding to the identifier of the originator CSE in local, create the resource for the originator CSE when there is no resource corresponding to the identifier of the originator CSE in local, set the resource name according to the identifier of the originator CSE, save the type of the originator CSE as an attribute, generate a CSE resource creation response message indicating that the resource creation is successful; and send the CSE resource creation response message to the originator CSE.

Preferably, the receiver CSE is further used to: generate a CSE resource creation response message indicating that the resource creation is failed when there is the resource corresponding to the identifier of the originator CSE in local, and send the CSE resource creation response message to the originator CSE.

Preferably, the receiver CSE is further used to: when there is no resource corresponding to the identifier of the originator CSE in local, compare the received M2M service provider's identifier of the originator CSE with the M2M service provider's identifier of the receiver CSE with the local attribute; when the M2M service provider's identifier of the originator CSE and the M2M service provider's identifier of the receiver CSE with the local attribute are the same, create the resource for the originator CSE, set the resource name according to the identifier of the originator CSE and save the type of the originator CSE as an attribute, and generate a CSE resource creation response message indicating that the resource creation is successful; and send the CSE resource creation response message to the originator CSE, when the M2M service provider's identifier of the originator CSE and the M2M service provider's identifier of the receiver CSE with the local attribute are different, generate a CSE resource creation response message indicating that the resource creation is failed and send the CSE resource creation response message to the originator CSE.

Preferably, the originator CSE is further used to create the resource for the receiver CSE, set the resource name according to the identifier of the receiver CSE, and save the type of the receiver CSE as an attribute.

Preferably, the originator CSE is further used to: when the CSE resource creation response message comprises the M2M service provider's identifier of the receiver CSE, set the M2M service provider's identifier of the receiver CSE as a local attribute to save, or, set the M2M service provider's identifier of the receiver CSE as a local attribute and as an attribute of the resource created by the receiver CSE to save.

Preferably, the receiver CSE is further used to: after sending the CSE resource creation response message indicating that the resource creation is successful, send a CSE resource creation request message to the originator CSE, the CSE resource creation request message comprises:

the identifier of the receiver CSE and the type of the receiver CSE, or, the identifier of the receiver CSE, the type of the receiver CSE and the M2M service provider's identifier of the receiver CSE.

Preferably, after sending the CSE resource creation response message indicating that the resource creation is successful, the originator CSE is further used to: after receiving the CSE resource creation response message sent by the receiver CSE, detect whether there is the resource corresponding to the identifier of the receiver CSE in local, when there is the resource corresponding to the identifier of the receiver CSE in the local area of the originator CSE, generate a CSE resource creation response message indicating that the resource already exists or the resource creation is successful and sends it to the receiver CSE, when there is no resource corresponding to the identifier of the receiver CSE in the local area of the originator CSE, create the resource for the receiver CSE, save the type of the receiver CSE as an attribute, generate a CSE resource creation response message indicating that the resource creation is successful and send it to the receiver CSE.

Preferably, the originator CSE is further used to: when the CSE resource creation request message sent by the receiver CSE comprises the M2M service provider's identifier of the receiver CSE, compare the received M2M service provider's identifier of the receiver CSE with the M2M service provider's identifier of the originator CSE with the local attribute, when the comparison result is that the received M2M service provider's identifier of the receiver CSE and the M2M service provider's identifier of the originator CSE with the local attribute are the same, create the resource for the receiver CSE, sets the resource name according to the identifier of the receiver CSE and save the type of the receiver CSE as an attribute, generate a CSE resource creation response message indicating that the resource creation is successful and send it to the receiver CSE;

when the comparison result is that the received M2M service provider's identifier of the receiver CSE and the M2M service provider's identifier of the originator CSE with the local attribute are different, generate a CSE resource creation response message indicating that the resource creation is failed and send it to the receiver CSE.

Preferably, the receiver CSE is further used to: after receiving the CSE resource creation response message sent by the originator CSE, when the CSE resource creation response message indicates that the resource creation is successful or the resource already exists, then complete the registration;

when the CSE resource creation response message indicates that the resource creation is failed, delete the resource created for the originator CSE.

Those ordinarily skilled in the art can understand that all or some of the steps of the abovementioned embodiments may be implemented by using a computer program process, and the computer program may be stored in a computer-readable storage medium and executed on an appropriate hardware platform (such as a system, equipment, device, component, and so on), and during the execution, it comprises one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combinations of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments are implemented in the form of software functional module and sold or used as an individual product, they may be stored in a computer readable storage medium. The abovementioned computer-readable storage medium may be a read-only memory, magnetic or optical disk, and the like.

Anyone familiar with the technical field of the art within the technical scope disclosed in the present document can easily think of changes or replacements that shall fall within the protection scope of the present document. Therefore, the protection scope of the present document should be the protection scope of the claims.

INDUSTRIAL APPLICABILITY

The embodiment of the present document provides a registration method and system for common service entity, the originator CSE sends a CSE resource creation request message to the receiver CSE, the CSE resource creation request message comprises: the identifier of the originator CSE and the type of the originator CSE, or, the identifier of the originator CSE, the type of the originator CSE and the M2M service provider's identifier of the originator CSE; the receiver CSE detects whether there is a resource corresponding to the identifier of the originator CSE in local, creates a resource for the originator CSE when there is no resource corresponding to the identifier of the originator CSE in local, sets a resource name according to the identifier of the originator CSE, and saves the type of the originator CSE as an attribute, generates a CSE resource creation response message indicating that the resource creation is successful, and sends the CSE resource creation response message to the originator CSE. It achieves the registration between the CSEs, and solves the problem that the existing CSE registration mechanism cannot achieve the application interactive function.

What is claimed is:

1. A registration method for common service entity (CSE), comprising:
   an originator CSE sending a CSE resource creation request message to a receiver CSE, wherein the CSE resource creation request message comprises:
   an identifier of the originator CSE and a type of the originator CSE, or,
   an identifier of the originator CSE, a type of the originator CSE, and an M2M service provider's identifier of the originator CSE;
   the receiver CSE detecting whether there is already a CSE resource corresponding to the identifier of the originator CSE in a local area of the receiver CSE;
   the receiver CSE creating a CSE resource for the originator CSE if there is no CSE resource corresponding to the identifier of the originator CSE in the local area of the receiver CSE, setting a CSE resource name according to the identifier of the originator CSE, saving the type of the originator CSE as an attribute of the CSE resource created for the originator CSE, and generating a CSE resource creation response message indicating that the CSE resource creation is successful;
   the receiver CSE sending the CSE resource creation response message to the originator CSE.

2. The registration method for common service entity of claim 1, wherein, after the step of the receiver CSE detecting whether there is already a CSE resource corresponding to the identifier of the originator CSE in the local area of the receiver CSE, the method further comprises:
   if there is a CSE resource corresponding to the identifier of the originator CSE in the local area of the receiver CSE, the receiver CSE generating a CSE resource creation response message indicating that the CSE resource creation is failed;
   the receiver CSE sending the CSE resource creation response message to the originator CSE.

3. The registration method for common service entity of claim 1, wherein, when the CSE resource creation request message comprises the M2M service provider's identifier of the originator CSE, after the step of the receiver CSE detecting whether there is already a CSE resource corresponding to the identifier of the originator CSE in the local area of the receiver CSE, the method further comprises:
   if there is no CSE resource corresponding to the identifier of the originator CSE in the local area of the receiver CSE, the receiver CSE comparing a received M2M service provider's identifier of the originator CSE with an M2M service provider's identifier of a receiver CSE with a local attribute;
   when the M2M service provider's identifier of the originator CSE and the M2M service provider's identifier of the receiver CSE with the local attribute are the same, the receiver CSE creating a CSE resource for the originator CSE, setting a CSE resource name according to the identifier of the originator CSE and saving the type of the originator CSE as an attribute of the CSE resource created for the originator CSE, and generating a CSE resource creation response message indicating that the CSE resource creation is successful;
   the receiver CSE sending the CSE resource creation response message to the originator CSE.

4. The registration method for common service entity of claim 3, wherein, after the step of, if there is no CSE resource corresponding to the identifier of the originator CSE in the local area of the receiver CSE, the receiver CSE comparing a received M2M service provider's identifier of the originator CSE with an M2M service provider's identifier of a receiver CSE with a local attribute, the method further comprises:
   when the M2M service provider's identifier of the originator CSE and the M2M service provider's identifier of the receiver CSE with the local attribute are different, the receiver CSE generating a CSE resource creation response message indicating that the CSE resource creation is failed;
   the receiver CSE sending the CSE resource creation response message to the originator CSE.

5. The registration method for common service entity of claim 3, wherein, after the step of the receiver CSE sending the CSE resource creation response message to the originator CSE, the method further comprises:
   after sending the CSE resource creation response message indicating that the CSE resource creation is successful, the receiver CSE sending a CSE resource creation request message to the originator CSE, wherein the CSE resource creation request message comprises:
   an identifier of the receiver CSE and a type of the receiver CSE, or,
   an identifier of the receiver CSE, a type of the receiver CSE and an M2M service provider's identifier of the receiver CSE.

6. The registration method for common service entity of claim 5, wherein, after the step of, after sending the CSE resource creation response message indicating that the CSE resource creation is successful, the receiver CSE sending a CSE resource creation request message to the originator CSE, the method further comprises:
   after receiving the CSE resource creation response message sent by the receiver CSE, the originator CSE detecting whether there is already a CSE resource corresponding to the identifier of the receiver CSE in the local area of the originator CSE;
   if there is already a CSE resource corresponding to the identifier of the receiver CSE in the local area of the originator CSE, the originator CSE generating a CSE resource creation response message indicating that the CSE resource corresponding to the identifier of the receiver CSE already exists or the CSE resource creation is successful and sending the message to the receiver CSE;

if there is no CSE resource corresponding to the identifier of the receiver CSE in the local area of the originator CSE, the originator CSE creating a CSE resource for the receiver CSE, and saving the type of the receiver CSE as an attribute of the CSE resource created for the receiver CSE, generating a CSE resource creation response message indicating that the CSE resource creation is successful and sending the message to the receiver CSE.

7. The registration method for common service entity of claim 6, wherein, when the CSE resource creation request message sent by the receiver CSE comprises the M2M service provider's identifier of the receiver CSE, and after the step of, after receiving the CSE resource creation response message sent by the receiver CSE, the originator CSE detecting whether there is already a CSE resource corresponding to the identifier of the receiver CSE in the local area of the originator CSE, the method further comprises:

the originator CSE comparing the received M2M service provider's identifier of the receiver CSE with the M2M service provider's identifier of the originator CSE with a local attribute, when a comparison result is that the received M2M service provider's identifier of the receiver CSE and the M2M service provider's identifier of the originator CSE with a local attribute are the same, the originator CSE creating a CSE resource for the receiver CSE, setting a CSE resource name according to the identifier of the receiver CSE and saving the type of the receiver CSE as an attribute of the CSE resource created for the receiver CSE, generating a CSE resource creation response message indicating that the CSE resource creation is successful and sending the message to the receiver CSE;

when the comparison result is that the received M2M service provider's identifier of the receiver CSE and the M2M service provider's identifier of the originator CSE with a local attribute are different, the originator CSE generating a CSE resource creation response message indicating that the CSE resource creation is failed and sending the message to the receiver CSE.

8. The registration method for common service entity of claim 6, wherein, the method further comprises:

after the receiver CSE receives the CSE resource creation response message sent by the originator CSE, when the CSE resource creation response message indicates that the CSE resource creation is successful or the CSE resource already exists, then completing a registration;

when the CSE resource creation response message indicates that the CSE resource creation is failed, then deleting the CSE resource created for the originator CSE.

9. The registration method for common service entity of claim 5, wherein, the method further comprises:

the receiver CSE starting a waiting timer when sending the CSE resource creation request message, and wherein, the method further comprises:

if the receiver CSE still does not receive the CSE resource creation response message sent by the originator CSE when the waiting timer expires, the receiver CSE deleting the CSE resource created for the originator CSE.

10. The registration method for common service entity of claim 1, wherein, the CSE resource creation response message comprises:

an indication that CSE resource creation is failed; or, an indication that CSE resource creation is successful; or, an indication that CSE resource creation is successful, an identifier of the receiver CSE and a type of the receiver CSE; or, an indication that CSE resource creation is successful, an identifier of the receiver CSE, a type of the receiver CSE, and an M2M service provider's identifier of the receiver CSE.

11. The registration method for common service entity of claim 10, wherein, after the step of the receiver CSE sending the CSE resource creation response message to the originator CSE, the method further comprises:

the originator CSE creating a CSE resource for the receiver CSE, setting a CSE resource name according to the identifier of the receiver CSE, and saving the type of the receiver CSE as an attribute of the CSE resource created for the receiver CSE.

12. The registration method for common service entity of claim 11, wherein, when the CSE resource creation response message comprises the M2M service provider's identifier of the receiver CSE, the method further comprises:

the originator CSE setting the M2M service provider's identifier of the receiver CSE as a local attribute to save, or, setting the M2M service provider's identifier of the receiver CSE as a local attribute and as an attribute of the CSE resource created for the receiver CSE to save.

13. The registration method for common service entity of claim 1, wherein, after creating the CSE resource, the attribute "Online Status" value of the created CSE resource is set to be "Online".

14. A registration system for common service entity, comprising an originator CSE and a receiver CSE; wherein the originator CSE is configured to: send a CSE resource creation request message to a receiver CSE, wherein the CSE resource creation request message comprises:

an identifier of the originator CSE and a type of the originator CSE, or, an identifier of the originator CSE, a type of the originator CSE, and an M2M service provider's identifier of the originator CSE;

the receiver CSE is configured to: detect whether there is already a CSE resource corresponding to the identifier of the originator CSE in a local area of the receiver CSE; create a CSE resource for the originator CSE if there is no CSE resource corresponding to the identifier of the originator CSE in the local area of the receiver CSE, set a CSE resource name according to the identifier of the originator CSE, and save the type of the originator CSE as an attribute of the CSE resource created for the originator CSE, generate a CSE resource creation response message indicating that the CSE resource creation is successful; and send the CSE resource creation response message to the originator CSE.

15. The registration system for common service entity of claim 14, wherein, the receiver CSE is further configured to: if there is a CSE resource corresponding to the identifier of the originator CSE in the local area of the receiver CSE, generate a CSE resource creation response message indicating that the CSE resource creation is failed, and send the CSE resource creation response message to the originator CSE.

16. The registration system for common service entity of claim 14, wherein,
the receiver CSE is further configured to: if there is no CSE resource corresponding to the identifier of the originator CSE in the local area of the receiver CSE, compare a received M2M service provider's identifier of the originator CSE with an M2M service provider's identifier of a receiver CSE with a local attribute; when the M2M service provider's identifier of the originator CSE and the M2M service provider's identifier of the receiver CSE with the local attribute are the same, create a CSE resource for the originator CSE, set a CSE resource name according to the identifier of the originator CSE and save the type of the originator CSE as an attribute of the CSE resource created for the originator CSE, generate a CSE resource creation response message indicating that the CSE resource creation is successful and send the CSE resource creation response message to the originator CSE,
when the M2M service provider's identifier of the originator CSE and the M2M service provider's identifier of the receiver CSE with the local attribute are different, generate a CSE resource creation response message indicating that the CSE resource creation is failed; and send the CSE resource creation response message to the originator CSE.

17. The registration system for common service entity of claim 16, wherein,
the originator CSE is further configured to: create a CSE resource for the receiver CSE, set a CSE resource name according to the identifier of the receiver CSE, and save the type of the receiver CSE as an attribute of the CSE resource created for the receiver CSE,
and wherein,
the originator CSE is further configured to: when the CSE resource creation response message comprises the M2M service provider's identifier of the receiver CSE, set the M2M service provider's identifier of the receiver CSE as a local attribute to save, or,
set the M2M service provider's identifier of the receiver CSE as a local attribute and as an attribute of the CSE resource created for the receiver CSE to save.

18. The registration system for common service entity of claim 16, wherein,
the receiver CSE is further configured to: after sending the CSE resource creation response message indicating that the CSE resource creation is successful, send a CSE resource creation request message to the originator CSE, wherein the CSE resource creation request message comprises:
an identifier of the receiver CSE and a type of the receiver CSE, or,
an identifier of the receiver CSE, a type of the receiver CSE and an M2M service provider's identifier of the receiver CSE.

19. The registration system for common service entity of claim 18, wherein,
the originator CSE is further configured to: after receiving the CSE resource creation response message sent by the receiver CSE, detect whether there is already a CSE resource corresponding to the identifier of the receiver CSE in the local area of the originator CSE;
if there is already a CSE resource corresponding to the identifier of the receiver CSE in the local area of the originator CSE, generate a CSE resource creation response message indicating that the CSE resource corresponding to the identifier of the receiver CSE already exists or the CSE resource creation is successful and send the message to the receiver CSE;
if there is no CSE resource corresponding to the identifier of the receiver CSE in the local area of the originator CSE, create a CSE resource for the receiver CSE, and save the type of the receiver CSE as an attribute of the CSE resource created for the receiver CSE, generate a CSE resource creation response message indicating that the CSE resource creation is successful and send the message to the receiver CSE,
and wherein,
the originator CSE is further configured to: when the CSE resource creation request message sent by the receiver CSE comprises the M2M service provider's identifier of the receiver CSE, compare the received M2M service provider's identifier of the receiver CSE with the M2M service provider's identifier of the originator CSE with a local attribute,
when a comparison result is that the received M2M service provider's identifier of the receiver CSE and the M2M service provider's identifier of the originator CSE with a local attribute are the same, create a CSE resource for the receiver CSE, set a CSE resource name according to the identifier of the receiver CSE and save the type of the receiver CSE as an attribute of the CSE resource created for the receiver CSE, generate a CSE resource creation response message indicating that the CSE resource creation is successful and send the message to the receiver CSE;
when the comparison result is that the received M2M service provider's identifier of the receiver CSE and the M2M service provider's identifier of the originator CSE with a local attribute are different, generate a CSE resource creation response message indicating that the CSE resource creation is failed and send the message to the receiver CSE.

20. The registration system for common service entity of claim 19, wherein,
the receiver CSE is further configured to: after receiving the CSE resource creation response message sent by the originator CSE,
when the CSE resource creation response message indicates that the CSE resource creation is successful or the CSE resource already exists, then complete a registration;
when the CSE resource creation response message indicates that the CSE resource creation is failed, delete the CSE resource created for the originator CSE.

* * * * *